United States Patent [19]

Norbeck

[11] 4,021,704
[45] May 3, 1977

[54] PHASE SEQUENCE CORRECTING SYSTEM FOR THREE-PHASE AC POWER

[75] Inventor: Dean K. Norbeck, York, Pa.

[73] Assignee: Borg-Warner Corporation, Chicago, Ill.

[22] Filed: Feb. 27, 1976

[21] Appl. No.: 661,895

[52] U.S. Cl. .................................. 361/77; 307/127; 361/78
[51] Int. Cl.² ........................................ H02H 3/26
[58] Field of Search ............. 317/48, 47, 46, 27 R; 307/127

[56] References Cited

UNITED STATES PATENTS

| | | | |
|---|---|---|---|
| 1,753,383 | 4/1930 | McDonald | 307/40 |
| 2,724,782 | 11/1955 | Holloway | 317/48 X |
| 2,914,703 | 11/1959 | Clark | 317/48 |
| 3,387,183 | 6/1968 | Hess | 317/47 |
| 3,825,768 | 6/1974 | Grygera | 307/127 |
| 3,976,919 | 8/1976 | Vandevier et al. | 317/47 |

Primary Examiner—J. D. Miller
Assistant Examiner—Patrick R. Salce
Attorney, Agent, or Firm—James E. Tracy

[57] ABSTRACT

The phase sequence of a three-phase AC power supply is detected and information representing that sequence is stored in a memory device, such as a flip-flop. Since the power supply, once it is energized, may require a few seconds to stabilize (such as may be the case when the power source is a diesel generator), the information fed to the memory device is likely to change during the stabilizing period. At the end of that period, however, the stored information represents the true phase sequence of the AC power supply, and at that time the information is read out and used to actuate switching apparatus to interconnect the three-phase AC power supply to the three terminals of a phase-sensitive load (such as a three-phase AC motor) in the manner necessary to provide the load with a desired phase rotation sequence. After the stabilizing period, the input circuitry of the memory device is inhibited so that the stored information representing the true phase sequence will be locked into the memory device and so that the device will be insensitive to any fluctuating voltages, frequency or noise that could otherwise cause an accidental phase reversal while the load is energized.

5 Claims, 1 Drawing Figure

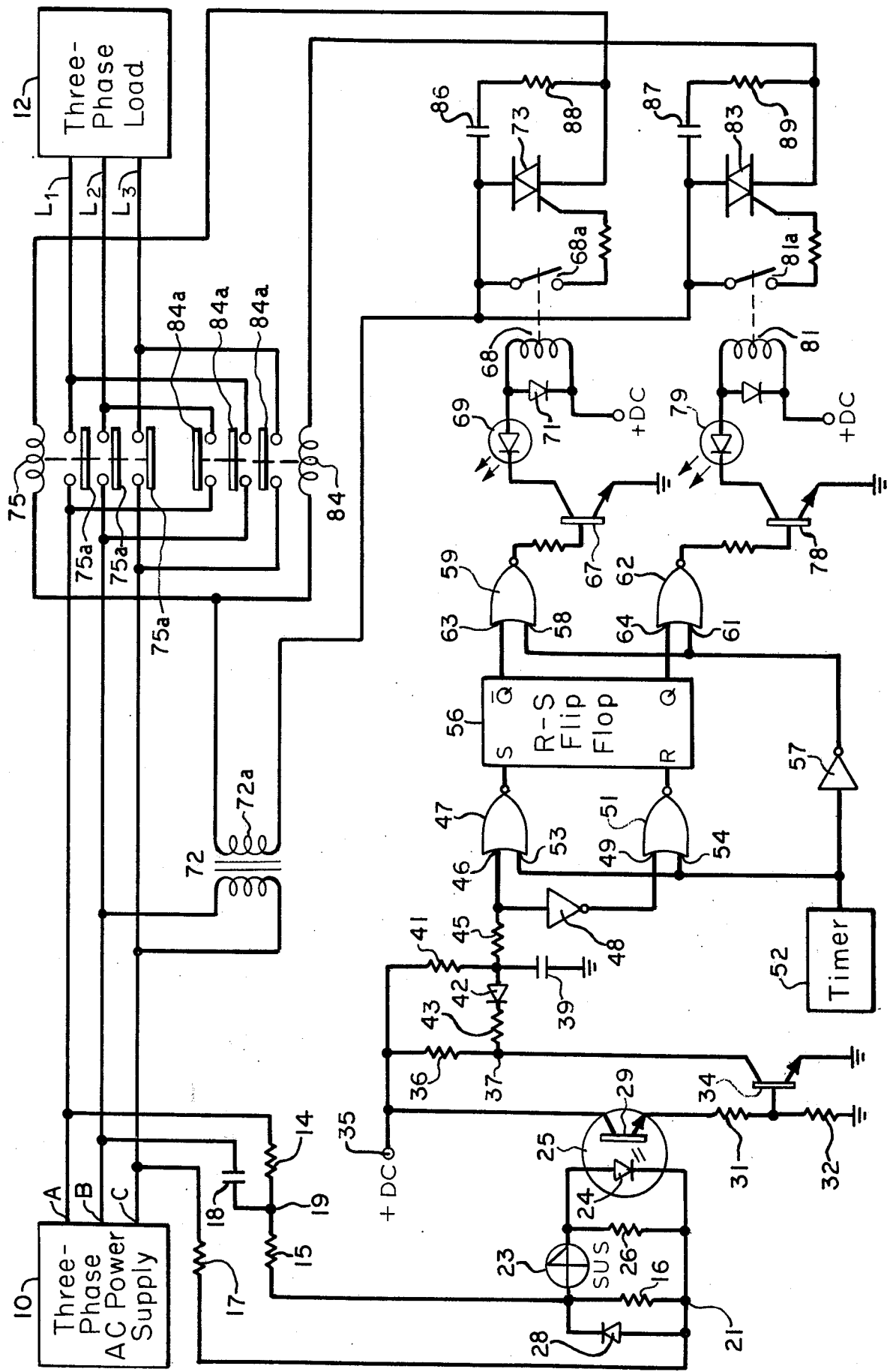

PHASE SEQUENCE CORRECTING SYSTEM FOR THREE-PHASE AC POWER

BACKGROUND OF THE INVENTION

This invention relates to a system for sensing the phase sequence of a three-phase AC power supply and for connecting a phase-sensitive, three-phase load to that power supply in a manner dictated by the phase sequence sensed in order that the AC power, as applied to the load, will have a desired sequence.

The invention may be employed in any three-phase electrical system where a phase-sensitive load is employed, such as a motor-driven compressor for a refrigeration system. Unless the phase voltages are applied to the motor in the correct sequence, the motor will rotate in the wrong direction and the compressor will not function properly. The invention is particularly attractive in an environment where the AC power source must be energized and requires a warm-up or stabilizing period during which the line voltages slowly build up to normal magnitude and, moreover, where the AC supply provides phase voltages having either one of the two possible phase sequences. For example, this may be the case when an engine generator (such as a diesel generator) is employed as the three-phase AC power source. Hence, the invention is ideally applicable to a refrigeration system in a truck.

The present invention provides a novel phase sequence correcting system for insuring that the phase voltages applied to a three-phase load are correctly sequenced. This is achieved by means of a unique digital logic arrangement which is of relatively inexpensive construction; requires very little power; is highly efficient, accurate and reliable; and can be contained within a small space.

SUMMARY OF THE INVENTION

The phase sequence correcting system of the invention controls the coupling of a three-terminal, three-phase AC power supply to a three-terminal, phase-sensitive load to apply three-phase power to the load in a desired phase rotation sequence. The system comprises a phase sequence sensing means for detecting the phase rotation sequence of the three-phase AC power supply. There is a memory device and write-in means, which responds to the sensing means, for actuating the memory device to store information therein representing the phase sequence of the AC power supply. Inhibiting means inhibits the operation of the write-in means, when a predetermined time delay interval has elapsed after the system has been rendered operable, in order to lock the stored phase sequence information in the memory device. Read-out means is provided for reading out the stored phase sequence information from the memory device. Finally, the system comprises switching means, responsive to the read-out means, for interconnecting the three terminals of the three-phase AC power supply to the three terminals of the load in accordance with the interconnection pattern required to provide the load with the desired phase sequence.

DESCRIPTION OF THE DRAWING

The features of the invention which are believed to be novel are set forth with particularity in the appended claims. The invention, together with further advantages and features thereof, may best be understood, however, by reference to the following description in conjunction with the accompanying drawing which schematically illustrates a phase sequence correcting system, constructed in accordance with one embodiment of the invention, and the manner in which the system controls the coupling of a three-phase AC power supply to a phase-sensitive, three-phase load.

DESCRIPTION OF THE ILLUSTRATED EMBODIMENT

Block 10 represents a conventional three-phase AC power supply having three terminals each of which provides an alternating voltage, varying in sinusoidal fashion, of the same RMS or root-mean-square amplitude and the same commutating frequency, the three alternating voltages being phase-displaced with respect to each other by 120°. The three phase voltages are designated phase A, B and C as indicated by the labels attached to the three output line conductors of power supply 10. Since there is no neutral line from the power supply, each of the phase voltages is actually a line-to-line voltage and appears or is produced at one terminal of power supply 10 relative to another of its terminals. The RMS magnitude of each phase voltage may take any appropriate value depending on the characteristics of the load 12 to be energized. For example, if the invention is incorporated in a refrigeration system in a truck or in a regrigerator boxcar, load 12 may take the form of a three-phase AC motor for driving the compressor in the refrigeration system. Such a compressor motor may require phase voltages on the order of 440 volts. In that environment, power supply 10 will normally constitute a diesel generator. The commutating frequency of the phase voltages may take any appropriate magnitude. Usually, a diesel generator will be operated at a frequency between 30 and 70 cycles per second or hertz.

The phase sequence of the three phase voltages produced by AC power supply 10 may be either ABC or BAC. To explain, when the sequence is ABC the phase on line conductor A will lead that on conductor B by 120° and the phase found on line conductor C will lag phase B by 120°. When the only other possible phase sequence (namely BAC) is present at the output of power supply 10, phase B leads phase A by 120° and phase C lags phase A by 120°. In the particular embodiment illustrated it will be assumed that phase-sensitive load 12 is a compressor motor and requires the phase sequence ABC or L1-L2-L3 in order to rotate in the right direction. In other words, the phase on line conductor L1 must lead that on line conductor L2 by 120°, which in turn must lead the phase on line conductor L3 by 120°. As will be explained, AC power source 10 will be appropriately connected to load 12 so that the load receives the three phase power in accordance with the phase sequence L1-L2-L3.

The network comprising resistors 14, 15, 16 and 17 and capacitor 18 provides a relatively simple sensing arrangement for detecting the phase sequence existing at power supply 10. The resistance of resistor 14 is made equal to the reactance of capacitor 18 at the commutating frequency. When supply 10 provides 440 volts, resistors 15, 16 and 17 preferably have the resistances 36K, 3.3K and 56K ohms respectively. The manner in which the detector operates is described in detail in "Electrical Engineering Science," by Preston R. Clement and Walter C. Johnson, McGraw-Hill Book Company Inc., New York, 1960, pages 558 and 559. By means of vector diagrams, it can be demonstrated that when the phase sequence is ABC at power supply 10 the alternating voltage between circuit junctions 19 and 21 will have a relatively high magnitude, whereas that alternating voltage will be of relatively low magnitude when the phase sequence at power supply 10 is BAC. This voltage is appropriately divided by resistors 15 and 16 to provide, across resistor 16, a trigger voltage for silicon unilateral switch or SUS 23 having a value within the switching range of the switch. When the phase sequence is BAC the alternating voltage across resistor 16 will be less than the threshold level of SUS 23 and thus will be insufficient to turn that device on. On the other hand, in the presence of phase sequence ABC, the voltage across resistor 16 will be sufficient to trigger SUS 23 into conduction early in each positive half cycle, thereby causing current flow through the light emitting diode or LED 24 of optically coupled isolator 25. Resistor 26 prevents false triggering by leakage currents in LED 24 and SUS 23. Diode 28 is included to maintain the same impedance in both current directions between junctions 19 and 21.

The current flowing through LED 24, when sequence ABC is sensed, produces light emission which turns on photo sensitive transistor 29, whereupon current flows from positive DC voltage source 35 and through resistors 31 and 32 to the ground plane of reference potential. Resistors 31 and 32 preferably have resistances of 10K and 2K ohms respectively and source 35 is around 12 volts. Positive voltage is therefore applied to the base of transistor 34 to effect current flow from DC source 35 through resistor 36 (around 10K ohms) and the collector-emitter conduction path of transistor 34 to the ground plane. Hence, each time a positive half cycle appears between junctions 19 and 21 when sequence ABC is sensed, LED 24 flashes and causes junction 37 to be essentially grounded. Assuming that the commutating frequency is 60 hertz, LED 24 will thus flash 60 times a second.

The charging circuit for capacitor 39, which includes resistor 41 (preferably around 200K ohms), has a charging time constant sufficiently long that the capacitor accumulates no substantial charge when the sequence is ABC. This occurs since capacitor 39 discharges through diode 42 and resistor 43 (preferably about 1K ohms) each time circuit junction or node 37 is grounded, and this happens 60 times per second. As a consequence, when sequence ABC is detected a relatively low DC voltage (the ground plane potential level) will be applied through resistor 45 (preferably around 10K ohms) to input 46 of NOR gate 47. This ground voltage level constitutes the logic 0 signal level for the illustrated digital logic circuits. At the same time that logic 0 is applied to input 46, that signal level is converted by inverter 48 to a logic 1 signal for application to input 49 of NOR gate 51.

Attention will now be directed to timer 52 and its function. When the entire system is intially rendered operative or turned on, transients could occur or power supply 10 may require a few seconds to build up the line voltages to their normal magnitude. During that stabilizing time, the signals applied to coupler 25 may be erratic before the switching transients die out and the line voltages reach their normal magnitude. For that reason, it is important that no connections be made between power supply 10 and load 12 until a stable phase sequence signal is determined at the end of the stabilizing period. Timer 52 insures that no connections are made to the load until that period has passed.

It may take any of a variety of different constructions in order to initially produce a logic 0 output at the instant the system is turned on and to maintain that logic 0 signal until a predetermined time delay interval (namely the stabilizing period) has elapsed. For example, this time delay may be made around 5 seconds. At the conclusion of the time delay, the output of timer 52 should produce a logic 1 signal which remains so long as the system remains energized. Timer 52 may, for example, take the form illustrated and described in "Electric Design," Jan. 4, 1974, page 158.

Input 53 of NOR gate 47 and input 54 of NOR gate 51 are therefore established at logic 0 during the stabilizing period. Hence, anytime that the sequence ABC is sensed during the warm-up period each of inputs 46, 53 and 54 is established at logic 0, while only input 49 will be at logic 1. As is the case with any NOR gate, if either input is logic 1 the output will be logic 0, and if both inputs are logic 0 the output will be logic 1. Thus, anytime sequence ABC is sensed the output of NOR gate 47 is logic 1 while the output of NOR gate 51 logic 0. During the stabilizing time, gates 47 and 51 serve as write-in means for actuating a memory device (R-S flip-flop 56) to store information therein representing the phase sequence of AC power supply 10. To explain, when sequence ABC is sensed the output of gate 47 establishes the set or S input of R-S flip-flop 56 at logic 1 and the output of gate 51 places the reset or R input of the flip-flop at logic 0. Those signal conditions will actuate the memory device or flip-flop to its set operating state in which output $\overline{Q}$ is established at logic 0 while output Q is at logic 1.

The output of flip-flop 56 during the stabilizing period will be ineffective in order to withhold the connections to load 12. During that interval, the logic 0 output of timer 52 is converted by inverter 57 to logic 1 for application to input 58 of NOR gate 59 and to input 61 of NOR gate 62. The logic 0 applied to input 63 from output $\overline{Q}$ and the logic 1 applied to input 64 from output Q will have no effect since the outputs of gates 59 and 62 are held at logic 0 by the logic 1 signals at inputs 58 and 61. As a result, during the stabilizing time the information stored in memory device 56 cannot be read out.

Assume now that sometime during the stabilizing period the voltage is low at power supply 10 or the detected phase sequence becomes BAC. When that occurs, the alternating voltage across resistor 16 will be insufficient to trigger silicon unilateral switch 23 and LED 24 no longer radiates light. Transistor 34 is therefore turned off and ground is removed from junction 37. Capacitor 39 now begins to charge slowly through resistor 41 to the positive voltage of DC source 35. When the voltage on the capacitor reaches the logic 1 level, input 46 becomes logic 1 while input 49 becomes logic 0. This, in turn, produces logic 0 and logic 1 signals at the S and R inputs, respectively, of flip-flop 56. The flip-flop thereupon triggers to its opposite or reset state in which the $\overline{Q}$ output becomes logic 1 while the Q output assumes the logic 0 level. However, the output of the flip-flop will still be ineffective since the outputs of gates 59 and 62 are held at logic 0 by the output of timer 52 during the stabilizing period.

At the end of the stabilizing period, timer 52 produces a logic 1 output for application to inputs 53 and 54. The outputs of NOR gates 47 and 51 thus become logic 0 and will be held there so long as the system remains energized. In this way, after information, representing the true phase sequence, is stored in flip-flop 56, the write-in means for the flip-flop is effectively inhibited so that it is insensitive to any subsequent changes that may take place, such as fluctuating voltages, frequency or noise. The true phase sequence information is thus locked in memory device 56.

At the same time, the output of timer 52 releases the read-out means so that the phase sequence information stored in flip-flop 56 may be read out and used to effect the proper connections from power supply 10 to load 12. To explain, the logic 1 signal level produced at the output of timer 52 at the end of the stabilizing period is converted by inverter 57 to a logic 0 signal for application to inputs 58 and 61 and this has the effect of releasing NOR gates 59 and 62 so that they can respond to the logic levels at outputs $\bar{Q}$ and Q. Assuming that the true phase sequence at power supply 10 is ABC, flip-flop 56 will have been established in its set operating state prior to the termination of the stabilizing period. Hence, when gates 59 and 62 are released by timer 52 the logic 0 signal at input 63 causes the output of gate 59 to become logic 1. Meanwhile, since input 64 is at logic 1, the output of gate 62 will remain at logic 0. Base current therefore flows through transistor 67, turning it on and completing an energizing circuit for the relay coil of relay 68 and for LED 69. The relay energizes and closes contacts 68a, while the LED emits light to provide a visual signal indicating that the true phase sequence at power supply 10 is ABC. Diode 71 is included to provide a circuit path for the fast-rising, high voltage DC pulse produced by the relay coil when transistor 67 is turned off. This prevents possible destruction of the transistor.

Closing of contacts 68a completes a circuit from secondary winding 72a of transformer 72 to the gate of triac 73, whereupon the triac turns on and connects contactor coil 75 across the secondary winding. If AC power supply 10 is a 440 volt source, then the turns ratio of transformer 72 is preferably such as to produce across secondary winding 72a an alternating voltage of about 220 volts. Contactor coil 75 therefore energizes and actuates movable contacts 75a upwardly to interconnect line conductor A to line conductor L1, conductor B to conductor L2 and conductor C to conductor L3. With that interconnection pattern, the phase sequence of the AC power supplied to load 12 will be L1-L2-L3 as is necessary in the embodiment illustrated.

On the other hand, in the event that the true phase sequence existing at power supply 10 is BAC, flip-flop 56 will be in its reset operating state at the conclusion of the stabilizing interval and the logic signals on inputs 63 and 64 will be reversed. Hence, when gates 59 and 62 are released by timer 52 the output of gate 59 will be logic 0 while the output of gate 62 will be logic 1. As a result, transistor 78 conducts and causes illumination of LED 79 and energization of the relay coil of relay 81. Contacts 81a close and render triac 83 conductive which in turn connects contactor coil 84 across secondary winding 72a. Movable contacts 84a thereupon actuate downwardly and toward coil 84 in order to interconnect line conductor A to line conductor L2, conductor B to conductor L1 and conductor C to conductor L3. With that particular interconnection pattern, the AC power received at load 12 will have the desired phase sequence L1-L2-L3. In other words, phase B on conductor L1 will lead phase A on conductor L2 by 120°, while phase C on conductor L3 will lag that on conductor L2 by 120°.

Capacitors 86 and 87 and resistors 88 and 89 provide snubber networks across triacs 73 and 83 to prevent rapid changes in voltage across the triacs and to prevent voltage transients from exceeding the ratings of the triacs, either of which could be detrimental.

The invention provides, therefore, a unique control system for controlling the delivery of three-phase power to a three-phase load in order that the load receives the power in a desired phase rotation sequence, regardless of the sequence existing at the power source. The system features a novel arrangement for withholding connections to the load until the power supply has stabilized and its phase sequence is unchanged. In addition, a unique inhibiting arrangement is included in order to render the system insensitive to false indications of phase sequence changes after the true sequence of the power supply has been determined.

While a particular embodiment of the invention has been shown and described, modifications may be made, and it is intended in the appended claims to cover all such modifications as may fall within the true spirit and scope of the invention.

I claim:

1. A phase sequence correcting system for coupling a three-terminal, three-phase AC power supply to a three-terminal, phase sensitive load to apply three-phase power to the load in a desired rotation sequence, comprising:
    phase sequence sensing means for detecting the phase rotation sequence of the three-phase AC power supply;
    a memory device;
    write-in means, responsive to said sensing means, for actuating said memory device to store information therein representing the phase sequence of the AC power supply;
    inhibiting means for inhibiting the operation of said write-in means, when a predetermined time delay interval has elapsed after the system has been rendered operable, in order to lock the stored phase sequence information in said memory device;
    read-out means for reading out the stored phase sequence information from said memory device;
    and switching means, responsive to said read-out means, for interconnecting the three terminals of the three-phase AC power supply to the three terminals of the load in accordance with the interconnection pattern required to provide the load with desired phase sequence.

2. A phase sequence correcting system according to claim 1 wherein said inhibiting means includes a timer which begins to operate when the system is turned on and produces a control signal to effect inhibiting after said predetermined time delay interval has elapsed.

3. A phase sequence correcting system according to claim 1 wherein said memory device is a flip-flop which may be operated between its two operating states until said inhibiting means operates, whereupon said flip-flop is locked in the operating state in which it was established just prior to the operation of said inhibiting means.

4. A phase sequence correcting system according to claim 3 in which said flip-flop is actuated, by said write-in means, to a predetermined one of its two states when the desired phase sequence exists at the three-phase AC power supply and to the opposite state when the undesired phase sequence is present, and wherein said switching means includes a pair of contactors one of which is actuated when said one operating state is read-out and the other contactor actuating when the opposite operating state is read-out.

5. A phase sequence correcting system according to claim 1 in which said write-in means includes first and second NOR gates, an input of said first gate receiving a logic 0 signal when the desired phase sequence exists at the AC power supply and a logic 1 signal when the undesired phase sequence prevails, and an input of said second gate receiving a logic 1 signal when the desired phase sequence is present and a logic 0 signal when the undesired phase sequence occurs; in which said memory device is an R-S flip-flop having its set input connected to the output of said first NOR gate and its reset input connected to the output of said second NOR gate; said flip-flop being actuated, prior to the operation of said inhibiting means, to its set operating state by said first NOR gate when the desired phase sequence exists at the AC power supply and to its reset operating state by said second NOR gate when the undesired phase sequence is present; and in which said inhibiting means applies logic 1 signals to the other inputs of said first and second NOR gates in order to produce logic 0 signals for application to both the set and reset inputs of said flip-flop, thereby locking said flip-flop in the particular state in which it was established immediately prior to the application of the logic 1 signals to said NOR gate from said inhibiting means.

* * * * *

UNITED STATES PATENT OFFICE
CERTIFICATE OF CORRECTION

PATENT NO. : 4,021,704
DATED : May 3, 1977
INVENTOR(S) : Dean K. Norbeck

It is certified that error appears in the above-identified patent and that said Letters Patent are hereby corrected as shown below:

Column 6, line 51, before "desired" insert -- the --.

Signed and Sealed this twelfth Day of July 1977

[SEAL]

Attest:

RUTH C. MASON
*Attesting Officer*

C. MARSHALL DANN
*Commissioner of Patents and Trademark*